(12) United States Patent
Lee et al.

(10) Patent No.: US 8,175,151 B2
(45) Date of Patent: May 8, 2012

(54) ENCODERS AND IMAGE ENCODING METHODS

(75) Inventors: I-Hsien Lee, Hsinchu (TW); Chia-Wen Lin, Chia-Yi (TW); Shih-Ming Hsu, Nantou County (TW)

(73) Assignee: Industrial Technology Research Institute, Hsinchu (TW)

( * ) Notice: Subject to any disclaimer, the term of this patent is extended or adjusted under 35 U.S.C. 154(b) by 1450 days.

(21) Appl. No.: 11/723,343

(22) Filed: Mar. 19, 2007

(65) Prior Publication Data

US 2008/0084999 A1 Apr. 10, 2008

(30) Foreign Application Priority Data

Oct. 5, 2006 (TW) ............................... 95137097 A

(51) Int. Cl.
*H04N 11/02* (2006.01)
(52) U.S. Cl. ..................... 375/240.1; 380/200
(58) Field of Classification Search .............. 375/240.01, 375/240; 380/200–202
See application file for complete search history.

(56) References Cited

U.S. PATENT DOCUMENTS

| | | | | |
|---|---|---|---|---|
| 6,529,550 B2* | 3/2003 | Tahara et al. | ................. | 375/240 |
| 6,611,624 B1 | 8/2003 | Zhang et al. | | |
| 6,628,712 B1* | 9/2003 | Le Maguet | ............... | 375/240.12 |
| 6,795,501 B1* | 9/2004 | Zhu | ........................... | 375/240.03 |
| 7,848,433 B1* | 12/2010 | Reibman et al. | ......... | 375/240.25 |
| 2002/0118755 A1* | 8/2002 | Karczewicz et al. | .... | 375/240.16 |
| 2003/0142744 A1* | 7/2003 | Wu et al. | .................. | 375/240.03 |
| 2003/0151753 A1* | 8/2003 | Li et al. | .......................... | 358/1.9 |
| 2006/0067402 A1 | 3/2006 | Wu et al. | | |
| 2006/0089838 A1 | 4/2006 | Gentric et al. | | |

FOREIGN PATENT DOCUMENTS

JP 2003-244700 A 8/2003

OTHER PUBLICATIONS

Karczewicz et al., "The SP- and SI-Frames Design for H.264/AVC," IEEE Transactions on Circuits and Systems for Video Technology, vol. 13, No. 7, Jul. 2003.
Sun et al., "Seamless Switching of Scalable Video Bitstreams for Efficient Streaming," IEEE Transactions on Multimedia, vol. 6, No. 2, Apr. 2004.

* cited by examiner

*Primary Examiner* — Nirav B. Patel
(74) *Attorney, Agent, or Firm* — Birch, Stewart, Kolasch & Birch, LLP

(57) ABSTRACT

An encoder. A first encoding unit discrete cosine transforms an input frame, quantizes the transformation result, and generates a first frame according to a motion vector. The first encoding unit includes a first feedback unit dequantizing the transformation result, generating a processing signal and a first reconstruction signal according to the dequantization result, and re-quantizing the processing signal to generate a requantization signal. A second encoding unit encodes according to the first reconstruction signal to generate a second frame and an encoding signal. The third encoding unit generates a third frame according to the encoding signal and the re-quantization signal.

29 Claims, 9 Drawing Sheets

ENCODERS AND IMAGE ENCODING METHODS

BACKGROUND OF THE INVENTION

1. Field of the Invention

The invention relates to encoders and image encoding methods, and more particularly to encoders and image encoding methods used in seamless bitstream switching.

2. Description of the Related Art

In conventional commercial video streaming, the server may store multiple bit-streams with different bitrates/resolutions to deal with bandwidth variation in standard compliance beforehand. With bitstream switching, the server chooses the bitstream which matches the client's available bandwidth. For example, clients with high channel bandwidth can subscribe to higher bitrate bitstreams for better video quality, whereas clients with low channel bandwidth subscribe to lower bitrate bitstreams with lower video quality.

FIG. 1A and FIG. 1B show conventional bitstream switching with direct switching. In FIG. 1A, as the client's available bandwidth decreases, bitstreams transmitted by server are switched from high bitrate bitstreams (H) to low bitrate bitstreams (L). The dotted blocks $P_{H1}$, $P_{H2}$, $P_{L3}$, $P_{L4}$, and $P_{L5}$ in FIG. 1A are frames received by the client. In FIG. 1B, as the client's available bandwidth increases, bitstreams transmitted by server switch from low bitrate bitstreams (L) to high bitrate bitstreams (H). The dotted blocks $P_{L1}$, $P_{L2}$, $P_{H3}$, $P_{H4}$, and $P_{H5}$ in FIG. 1B are the frames received by the client.

As shown in FIG. 1A, when bitstreams are switched from high bitrate bitstreams (H) to low bitrate bitstreams (L) at time t, the frames received by the client are the dotted blocks $P_{H1}$, $P_{H2}$, $P_{L3}$, $P_{L4}$, and $P_{L5}$ in sequence. In the encoder, predicted frame $P_{L3}$ is encoded according to frame $P_{L2}$. In the decoder, frame $P_{L3}$ is decoded according to the decoded frame $P_{H2}$. Because of the different reference frames in encoder and decoder, drift occurs at frame $P_{L3}$.

To avoid drift from bitrate switching, standard H.264 provides seamless bitstream switching. Standard H.264 defines a novel frame type, SP frame. Note that SP frame and P frame are all generated by predicted decoding according to time.

FIG. 2A shows a conventional server switching low bitrate bitstreams (L) to high bitrate bitstreams (H) by SP frame when the client's available bandwidth increases. The frames received by the client are the dotted blocks $P_{L1}$, $P_{L2}$, $SP_{LH}$, $P_{H4}$, and $P_{H5}$ in sequence. Note that the frame at switching point t is encoded to SP frame. SP frame comprises primary SP frames $SP_H$ and $SP_L$, and a secondary SP frame $SP_{LH}$. Thus, when the bitstream switches, drift errors are avoided by transmitting bridge SP frame $SP_{LH}$ to client at switching point t.

SP frames ($SP_L$, $SP_H$, and $SP_{LH}$) are obtained by encoder 300 in FIG. 3 according to P frame $P_{H3}$ and the original P frame $P_{L3}$ at switching point shown in FIG. 1A.

Encoder 300 comprises low bitrate encoding unit 310, high bitrate encoding unit 350, and bridge frame encoding unit 340, and generates SP frames $SP_H$, $SP_L$, and $SP_{LH}$ according to P frame $P_{H3}$ and $P_{L3}$.

Low bitrate encoding unit 310 comprises transformation unit 312, adder 314, quantization unit 316, statistic encoding unit 318 and feedback circuit 320. Transformation unit 312 receives P frame $P_{L3}$ and performs discrete cosine transformation to generate signal $X_{11}$. Adder 314 is coupled to transformation unit 312, and subtracts signal $X_{12}$ from signal $X_{11}$. Quantization unit 316 is coupled to adder 314, and quantifies the output of adder 314 to generate signal $X_{13}$. Statistic encoding unit 318 is coupled to quantization unit 316, and statistically encodes signal $X_{13}$ and motion vector MV to generate SP frame $SP_L$. Feedback circuit 320 is coupled between quantization unit 316 and adder 314, and generates signals $X_{12}$ and $X_{14}$ according to signal $X_{13}$. Note that transformation unit 312 can be a discrete cosine transformation unit, and statistic encoding unit 318 comprises entropy coding unit and variable length coding (VLC) unit, and motion vector MV is motion vector of P frame $P_{L3}$.

Feedback circuit 320 comprises dequantization unit 322, adder 324, requantization units 326 and 330, and signal processing unit 328. Dequantization unit 322 is coupled to quantization unit 316, receives signal $X_{13}$ and dequantizes the signal $X_{13}$. Adder 324 is coupled to dequantization unit 322, and adds the output of dequantization unit 322 and signal $X_{14}$. Requantization unit 326 is coupled between adder 324 and signal processing unit 328, and re-quantizes the output of adder 324 through quantization unit 3261 and dequantization unit 3263. Signal processing unit 328 is coupled to requantization unit 326, and generates signal $X_{14}$ through inverse transformation unit 3281, filter 3282, memory device 3283, compensation unit 3284 and transformation unit 3285 according to the output of requantization unit 326. Inverse transformation unit 3281 is coupled to requantization unit 326, and dequantizes the output of requantization unit 326. Filter 3282 is coupled to inverse transformation unit 3281, filters the output of inverse transformation unit 3281 and stores the filter result to memory device 3283. Compensation unit 3284 is coupled to memory device 3283, and compensates the output of filter 3282 according to motion vector MV. Transformation unit 3285 is coupled to compensation unit 3284, and performs discrete cosine transformation on the output of compensation unit 3284 to generate signal $X_{14}$. Requantization unit 330 is coupled between transformation unit 3285 and adder 314, and re-quantizes signal $X_{14}$ through quantization unit 3301 and dequantization unit 3303 to generate signal $X_{12}$.

Note that quantization unit 3261 and dequantization unit 3263 of requantization unit 326 and quantization unit 3301 and dequantization unit 3303 of requantization unit 330 have the same quantization parameter, and quantization unit 316 and dequantization unit 322 have the same quantization parameter. The quantization parameters of requantization unit 326 and requantization unit 330 are preferably smaller than those of quantization unit 316 and dequantization unit 322. Inverse transformation unit 3281 is an inverse discrete cosine transformation unit, and transformation unit 3285 is a discrete cosine transformation unit. Filter 3282 can be a loop filter, and compensation unit 3284 is a motion compensator.

High bitrate encoding unit 350 comprises transformation unit 352, adder 354, quantization unit 356, statistic encoding unit 358 and feedback circuit 360. Transformation unit 352 receives P frame $P_{H3}$ and performs discrete cosine transformation to generate signal $X_{21}$. Adder 354 is coupled to transformation unit 352, and subtracts signal $X_{22}$ from signal $X_{21}$. Quantization unit 356 is coupled to adder 354, and quantifies the output of adder 354 to generate signal $X_{23}$. Statistic encoding unit 358 is coupled to quantization unit 356, and statistically encodes signal $X_{23}$ and motion vector MV to generate SP frame $SP_H$. Feedback circuit 360 is coupled between quantization unit 356 and adder 354, and generates signals $X_{22}$ and $X_{24}$ according to signal $X_{23}$. Note that transformation unit 352 can be a discrete cosine transformation unit, and statistic encoding unit 358 comprises entropy coding unit and variable length coding (VLC) unit, and motion vector MV is motion vector of P frame $P_{L3}$.

Feedback circuit 360 comprises dequantization unit 362, adder 364, requantization units 366 and 370, and signal processing unit 368. Dequantization unit 362 is coupled to quantization unit 356, receives signal $X_{23}$ and dequantizes the signal $X_{23}$. Adder 364 is coupled to dequantization unit 362, and adds the output of dequantization unit 362 and signal $X_{25}$. Requantization unit 366 is coupled between adder 364 and signal processing unit 368, and re-quantizes the output of adder 364 through quantization unit 3661 and dequantization unit 3663 to generate signals $X_{24}$ and $X_{26}$. Signal processing unit 368 is coupled to requantization unit 366, and generates signal $X_{25}$ through inverse transformation unit 3681, filter 3682, memory device 3683, compensation unit 3684 and transformation unit 3685 according to signal $X_{26}$. Inverse transformation unit 3681 is coupled to requantization unit 366, and dequantizes signal $X_{26}$. Filter 3682 is coupled to inverse transformation unit 3681, filters the output of inverse transformation unit 3681 and stores the filter result to memory device 3683. Compensation unit 3684 is coupled to memory device 3683, and compensates the output of filter 3682 according to motion vector MV. Transformation unit 3685 is coupled to compensation unit 3684, and performs discrete cosine transformation on the output of compensation unit 3684 to generate signal $X_{25}$. Requantization unit 370 is coupled between transformation unit 3685 and adder 354, and re-quantizes signal $X_{25}$ through quantization unit 3701 and dequantization unit 3703 to generate signal $X_{22}$.

Note that quantization unit 3661 and dequantization unit 3663 of requantization unit 366 and quantization unit 3701 and dequantization unit 3703 of requantization unit 370 have the same quantization parameter, and quantization unit 356 and dequantization unit 362 have the same quantization parameter. The quantization parameters of requantization unit 366 and requantization unit 370 are preferably smaller than those of quantization unit 356 and dequantization unit 362. Inverse transformation unit 3681 is an inverse discrete cosine transformation unit, and transformation unit 3685 is a discrete cosine transformation unit. Filter 3682 can be a loop filter, and compensation unit 3684 is a motion compensator.

Bridge frame encoding unit 340 comprises quantization unit 342, adder 344, and statistic encoding unit 346. Quantization unit 342 quantifies signal $X_{14}$. Adder 344 subtracts the output of quantization unit 342 from signal $X_{24}$. Statistic encoding unit 346 statistically encodes the output of adder 344 according to motion vector MV to generate SP frame $SP_{LH}$.

FIG. 2B shows a conventional server switching high bitrate bitstreams (H) to low bitrate bitstreams (L) by SP frame when the client's available bandwidth decreases. The frames received by the client are the dotted blocks $P_{H1}$, $P_{H2}$, $SP_{HL}$, $P_{L4}$, and $P_{L5}$ in sequence. Note that bridge frame $SP_{HL}$ transmitted to client at switching point t is different with the bridge frame $SP_{LH}$ of FIG. 2A.

The seamless bitstream switching is achieved by the encoder 300 defined by H.264. Requantization units 326 and 330 of low bitrate encoding unit 310 and requantization units 366 and 370 of high bitrate encoding unit 350 with large quantization parameters decrease data size of the bitstream of SP frame $SP_{LH}$, however, encoding efficacy of SP frame $SP_H$ and $SP_L$ is also decreased.

BRIEF SUMMARY OF INVENTION

Encoders and image encoding methods are provided. An exemplary embodiment of an encoder comprises a first encoding unit coupled to a third encoding unit, discrete cosine transforming an input frame, quantizing the transformation result, and generating a first frame according to a motion vector, wherein the first encoding unit comprises a first feedback unit dequantizing the transformation result, generating a processing signal and a first reconstruction signal according to the dequantization result, and requantizing the processing signal to generate a requantization signal, and a second encoding unit coupled to the third encoding unit, encoding according to the first reconstruction signal to generate a second frame and an encoding signal, wherein the third encoding unit generates a third frame according to the encoding signal and the requantization signal.

An exemplary embodiment of an image encoding method comprises discrete cosine transforming an input frame, quantizing the transformation result, and generating a first frame according to a motion vector, dequantizing the transformation result, and generating a processing signal and a first reconstruction signal according to the dequantization result, requantizing the processing signal to generate a requantization signal, encoding according to the first reconstruction signal to generate a second frame and an encoding signal, and generating a third frame according to the encoding signal and the requantization signal.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 4A:
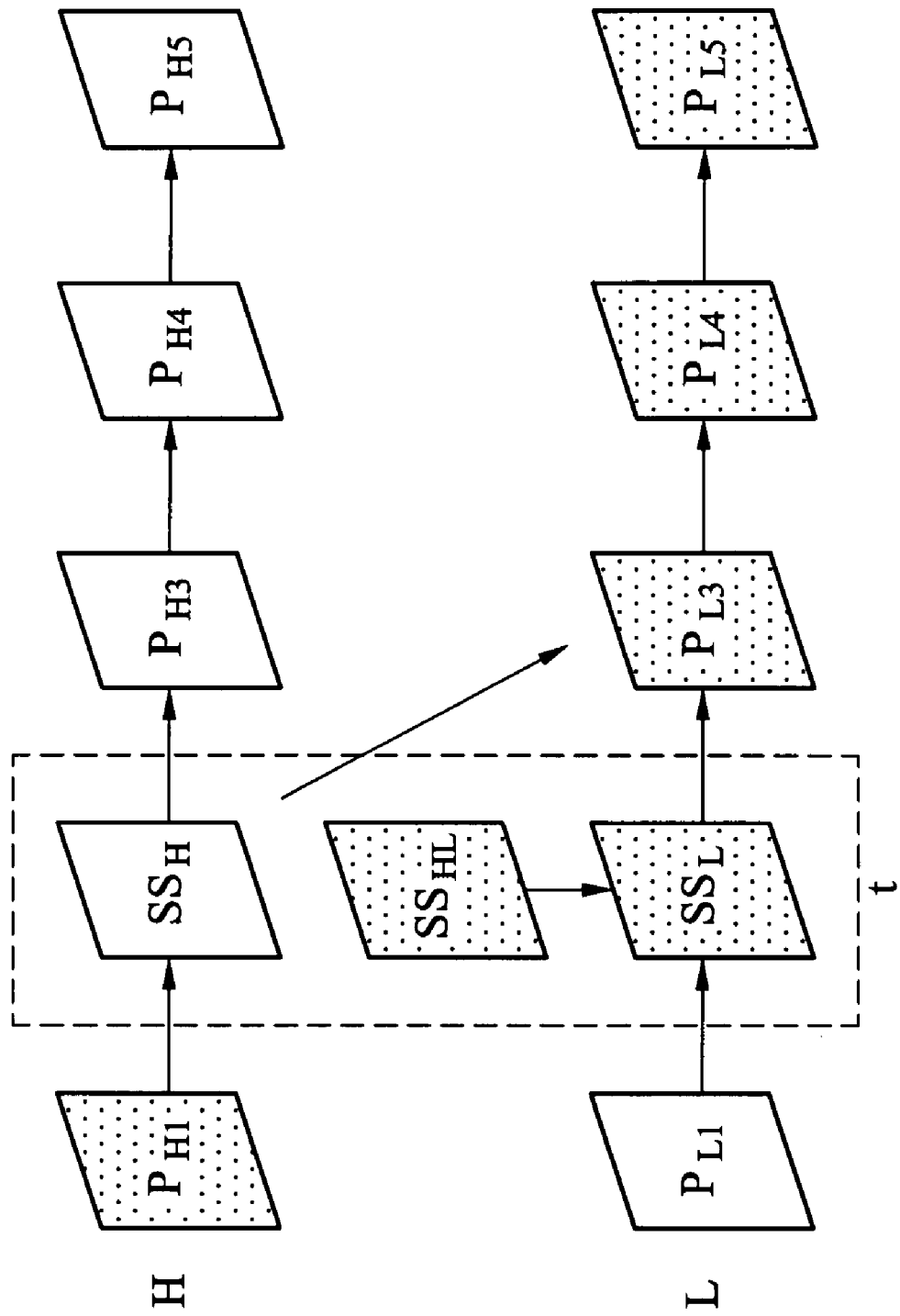
FIG. 4A shows a server switching high bitrate bitstreams (H) to low bitrate bitstreams (L) by SS frame when a client's available bandwidth decreases.

FIG. 4A shows a server switching high bitrate bitstreams (H) to low bitrate bitstreams (L) by SS frame when a client's available bandwidth decreases. The frames received by the client are the dotted blocks $P_{H1}$, $SS_{HL}$, $SS_L$, $P_{L3}$, $P_{L4}$, and $P_{L5}$ in sequence. In FIG. 4A, the block marked by dotted line at switching point t indicates the switching window for bitstream switching. The frames in the switching window are encoded as SS frame, wherein $SS_H$ and $SS_L$ are primary SS frames, and $SS_{HL}$ is a secondary SS frame.

In an embodiment of the invention, the server not only transmits the bitstream of secondary SS frame ($SS_{HL}$ as an example), but also the bitstream of low bitrate SS frame ($SS_L$ as an example) and motion vector of high bitrate SS frame to the client. Thus, Low bitrate encoding unit decodes SS frame $SS_L$ according to the received information, achieving seamless bitstream switching.

Figure 1A:
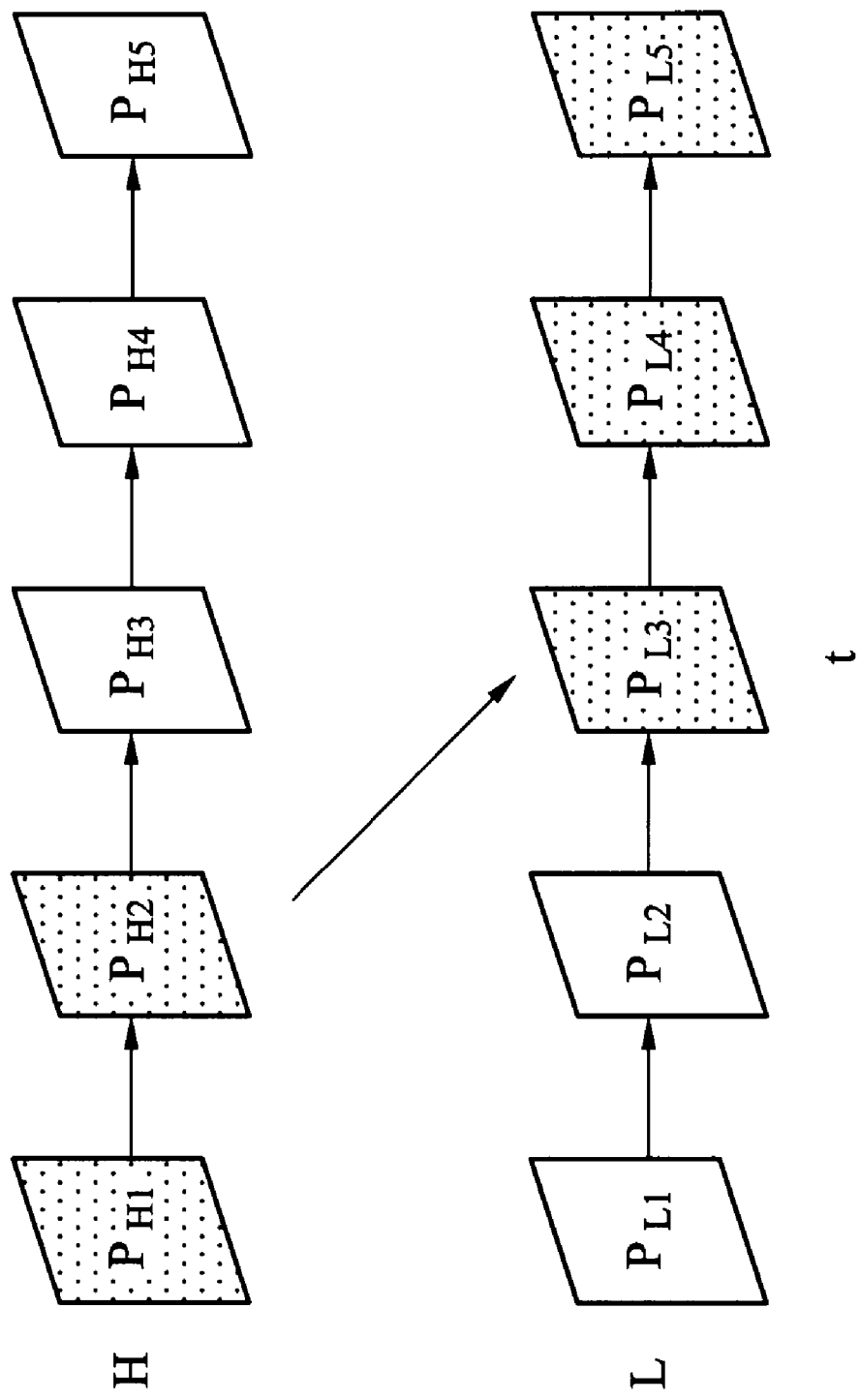
FIG. 1A and FIG. 1B show conventional bitstream switching with direct switching.
Figure 1B:
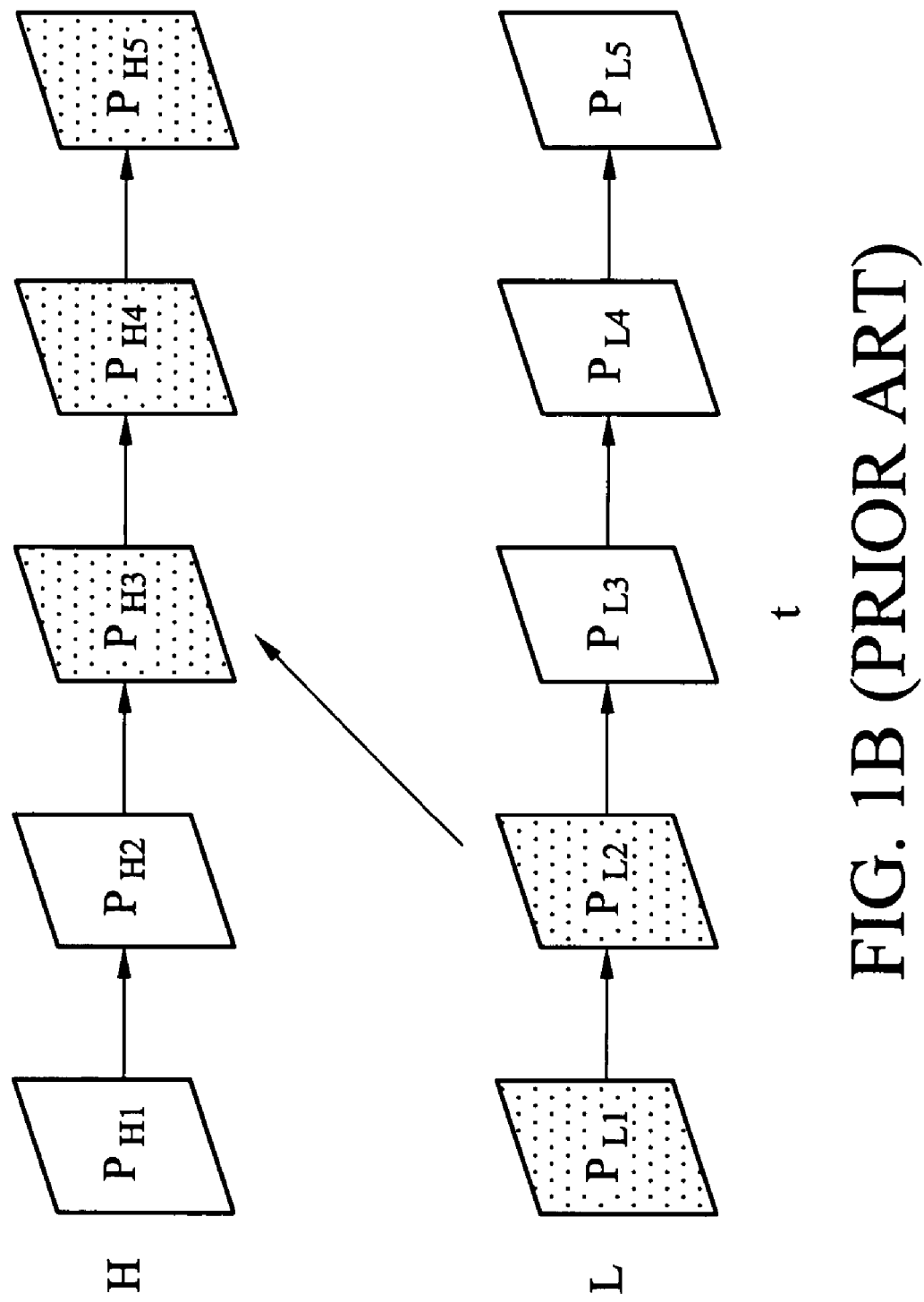
Figure 5:
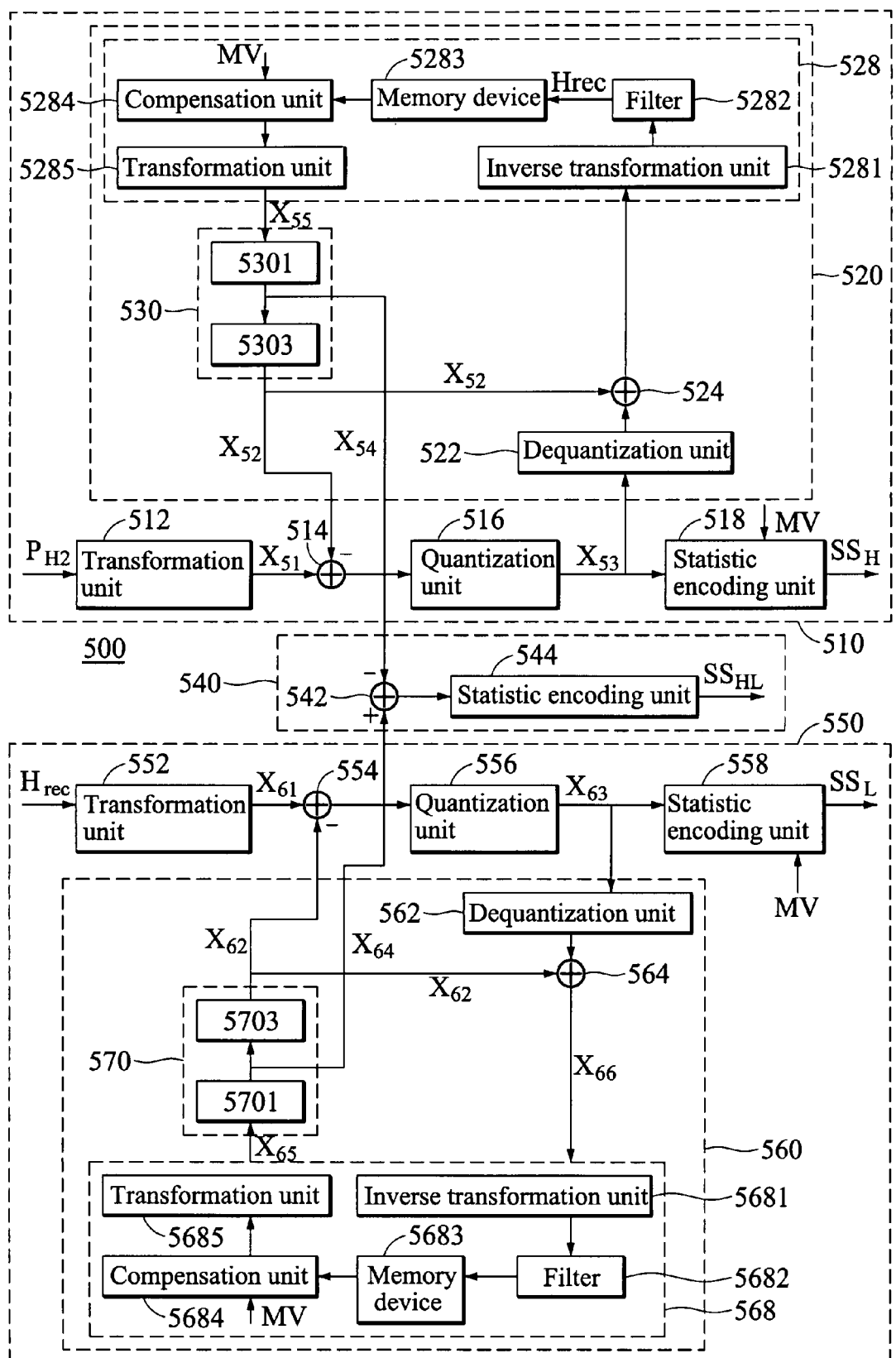
FIG. 5 is a block diagram of conventional encoder 500 according to an embodiment of the invention.

SS frames ($SS_L$, $SS_H$, and $SS_{HL}$) are obtained by encoder 500 in FIG. 5 according to the original P frame $P_{H2}$ at switching point shown in FIG. 1A.

Encoder 500 comprises high bitrate encoding unit 510, low bitrate encoding unit 550, and bridge frame encoding unit 540, and generates SS frames $SS_H$, $SS_L$, and $SP_{HL}$ according to P frame $P_{H2}$.

High bitrate encoding unit 510 comprises transformation unit 512, adder 514, quantization unit 516, statistic encoding unit 518 and feedback circuit 520. Transformation unit 512 receives P frame $P_{H2}$ and performs discrete cosine transformation to generate signal $X_{51}$. Adder 514 is coupled to transformation unit 512, and subtracts signal $X_{52}$ from signal $X_{51}$. Quantization unit 516 is coupled to adder 514, and quantifies the output of adder 514 to generate signal $X_{53}$. Statistic encoding unit 518 is coupled to quantization unit 516, and statistically encodes signal $X_{53}$ and motion vector MV to generate SS frame $SS_H$. Feedback circuit 520 is coupled between quantization unit 516 and adder 514, and generates signals $X_{52}$ and $X_{54}$ according to signal $X_{53}$. Note that transformation unit 512 can be a discrete cosine transformation unit, and statistic encoding unit 518 comprises entropy coding unit and variable length coding (VLC) unit, and motion vector MV is motion vector of P frame $P_{H2}$.

Feedback circuit 520 comprises dequantization unit 522, adder 524, requantization unit 530, and signal processing unit 528. Dequantization unit 522 is coupled to quantization unit 516, receives signal $X_{53}$ and dequantizes the signal $X_{53}$. Adder 524 is coupled to dequantization unit 522, and adds the output of dequantization unit 522 and signal $X_{52}$. Signal processing unit 528 is coupled to adder 524, and generates signal $X_{55}$ through inverse transformation unit 5281, filter 5282, memory device 5283, compensation unit 5284 and transformation unit 5285 according to the output of adder 524. Inverse transformation unit 5281 is coupled to adder 524, and dequantizes the output of adder 524. Filter 5282 is coupled to inverse transformation unit 5281, filters the output of inverse transformation unit 5281 and stores the filter result to memory device 5283. Compensation unit 5284 is coupled to memory device 5283, and compensates the output of filter 5282 according to motion vector MV. Transformation unit 5285 is coupled to compensation unit 5284, and performs discrete cosine transformation on the output of compensation unit 5284 to generate signal $X_{55}$. Requantization unit 530 is coupled between transformation unit 5285 and adder 514, and re-quantizes signal $X_{55}$ through quantization unit 5301 and dequantization unit 5303 to generate signal $X_{52}$.

Note that quantization unit 5301 and dequantization unit 5303 of requantization unit 530 have the same quantization parameters, and quantization unit 516 and dequantization unit 522 have the same quantization parameter. The quantization parameters of requantization unit 530 are preferably smaller than those of quantization unit 516 and dequantization unit 522. Inverse transformation unit 5281 is an inverse discrete cosine transformation unit, and transformation unit 5285 is a discrete cosine transformation unit. Filter 5282 can be a loop filter, and compensation unit 5284 is a motion compensator.

Low bitrate encoding unit 550 comprises transformation unit 552, adder 554, quantization unit 556, statistic encoding unit 558 and feedback circuit 560. Transformation unit 552 receives the output (reconstruction signal $H_{rec}$) of filter 5282 and performs discrete cosine transformation on $H_{rec}$ to generate signal $X_{61}$. Adder 554 is coupled to transformation unit 552, and subtracts signal $X_{62}$ from signal $X_{61}$. Quantization unit 556 is coupled to adder 554, and quantifies the output of adder 554 to generate signal $X_{63}$. Statistic encoding unit 558 is coupled to quantization unit 556, and statistically encodes signal $X_{63}$ and motion vector MV to generate SS frame $SS_L$. Feedback circuit 560 is coupled between quantization unit 556 and adder 554, and generates signals $X_{62}$ and $X_{64}$ according to signal $X_{63}$. Note that transformation unit 552 can be a discrete cosine transformation unit, and statistic encoding unit 558 may be an entropy coding unit or a variable length coding (VLC) unit, and motion vector MV is motion vector of P frame $P_{L2}$.

Feedback circuit 560 comprises dequantization unit 562, adder 564, requantization unit 570, and signal processing unit 568. Dequantization unit 562 is coupled to quantization unit 556, receives signal $X_{63}$ and dequantizes the signal $X_{63}$. Adder 564 is coupled to dequantization unit 562, and adds the output of dequantization unit 562 and signal $X_{62}$. Signal processing unit 568 is coupled to adder 564, and generates signal $X_{65}$ through inverse transformation unit 5681, filter 5682, memory device 5683, compensation unit 5684 and transformation unit 5685 according to signal $X_{66}$. Inverse transformation unit 5681 is coupled to adder 564, and dequantizes signal $X_{66}$. Filter 5682 is coupled to inverse transformation unit 5681, filters the output of inverse transformation unit 5681 and stores the filter result to memory device 5683. Compensation unit 5684 is coupled to memory device 5683, and compensates the output of filter 5682 according to motion vector MV. Transformation unit 5685 is coupled to compensation unit 5684, and performs discrete cosine transformation on the output of compensation unit 5684 to generate signal $X_{65}$. Requantization unit 570 is coupled between transformation unit 5685 and adder 554, and re-quantizes signal $X_{65}$ through quantization unit 5701 and dequantization unit 5703 to generate signal $X_{62}$.

Note that quantization unit 5701 and dequantization unit 5703 of requantization unit 570 have the same quantization parameter, and quantization unit 556 and dequantization unit 562 have the same quantization parameter. The quantization parameters of requantization unit 570 are preferably smaller than those of quantization unit 556 and dequantization unit 562. Inverse transformation unit 5681 is an inverse discrete cosine transformation unit, and transformation unit 5685 is a discrete cosine transformation unit. Filter 5682 can be a loop filter, and compensation unit 5684 is a motion compensator.

Bridge frame encoding unit 540 comprises adder 542 and statistic encoding unit 544. Adder 542 subtracts signal $X_{54}$ from signal $X_{64}$. Statistic encoding unit 544 statistically encodes the output of adder 542 and generates SS frame $SS_{HL}$.

Figure 4B:
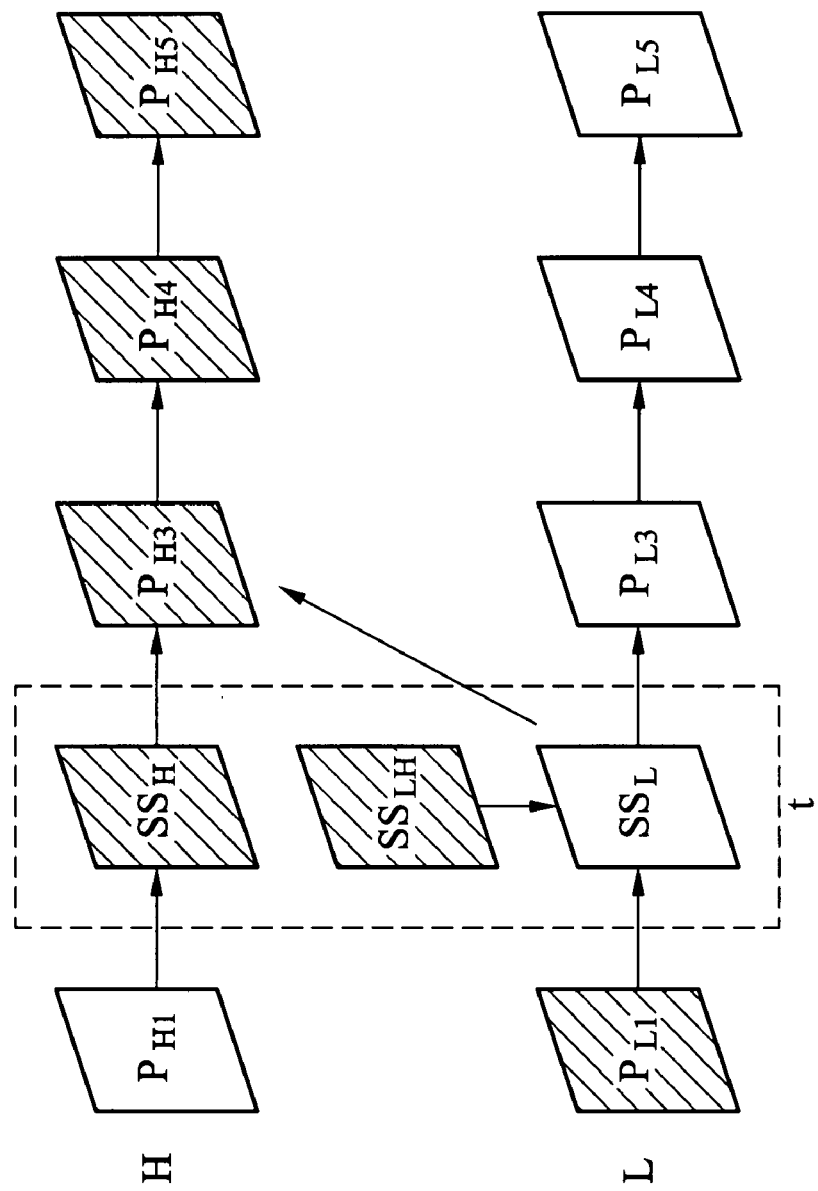
FIG. 4B shows a server switching low bitrate bitstreams (L) to high bitrate bitstreams (H) by SS frame when a client's available bandwidth increases.

FIG. 4B shows a server switching low bitrate bitstreams (L) to high bitrate bitstreams (H) by SS frame when the client's available bandwidth increases. The frames received by the client are the dotted blocks $P_{L1}$, $SS_{LH}$, $SP_H$, $P_{H3}$, $P_{H4}$ and $P_{H5}$ in sequence. Note that during bitstream switching, bridge frame $SS_{LH}$ transmitted to client at switching point t is the same with the bridge frame $SS_{HL}$ of FIG. 4A.

Figure 2A:
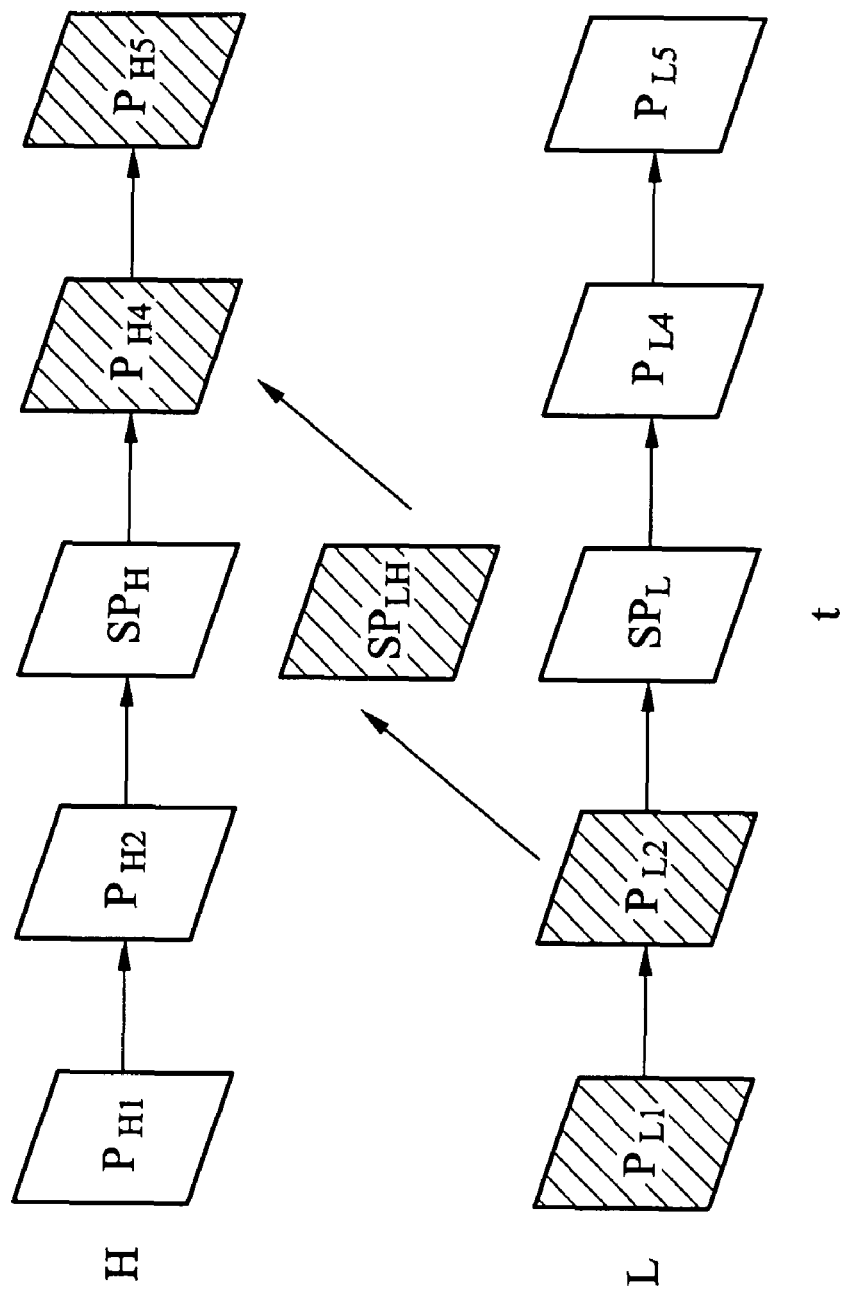
FIG. 2A shows a conventional server switching low bitrate bitstreams (L) to high bitrate bitstreams (H) by SP frame when a client's available bandwidth increases.
Figure 2B:
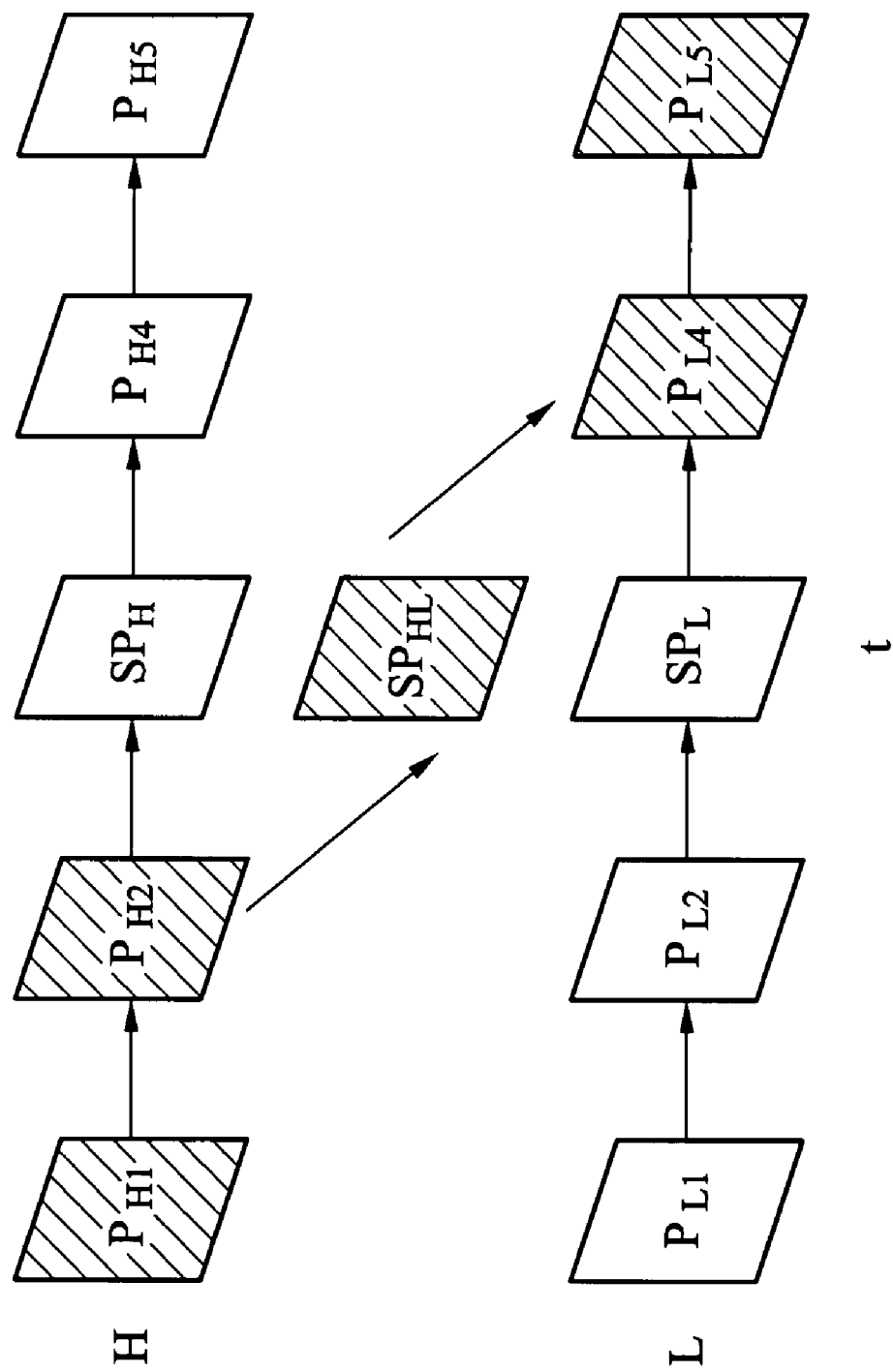
FIG. 2B shows a conventional server switching high bitrate bitstreams (H) to low bitrate bitstreams (L) by SP frame when a client's available bandwidth decreases.
Figure 3:
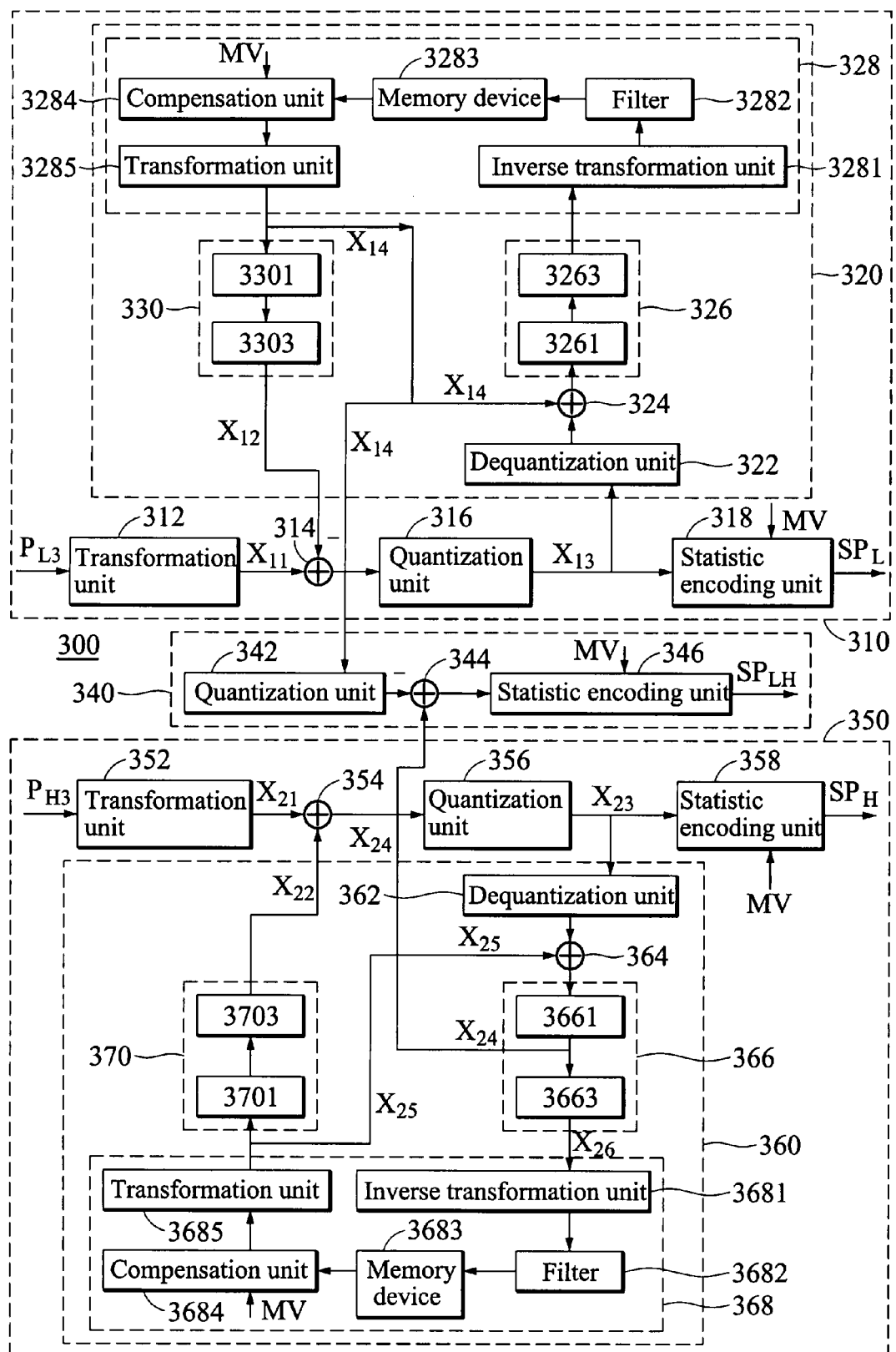
FIG. 3 is a block diagram of conventional encoder 300.
Figure 6:
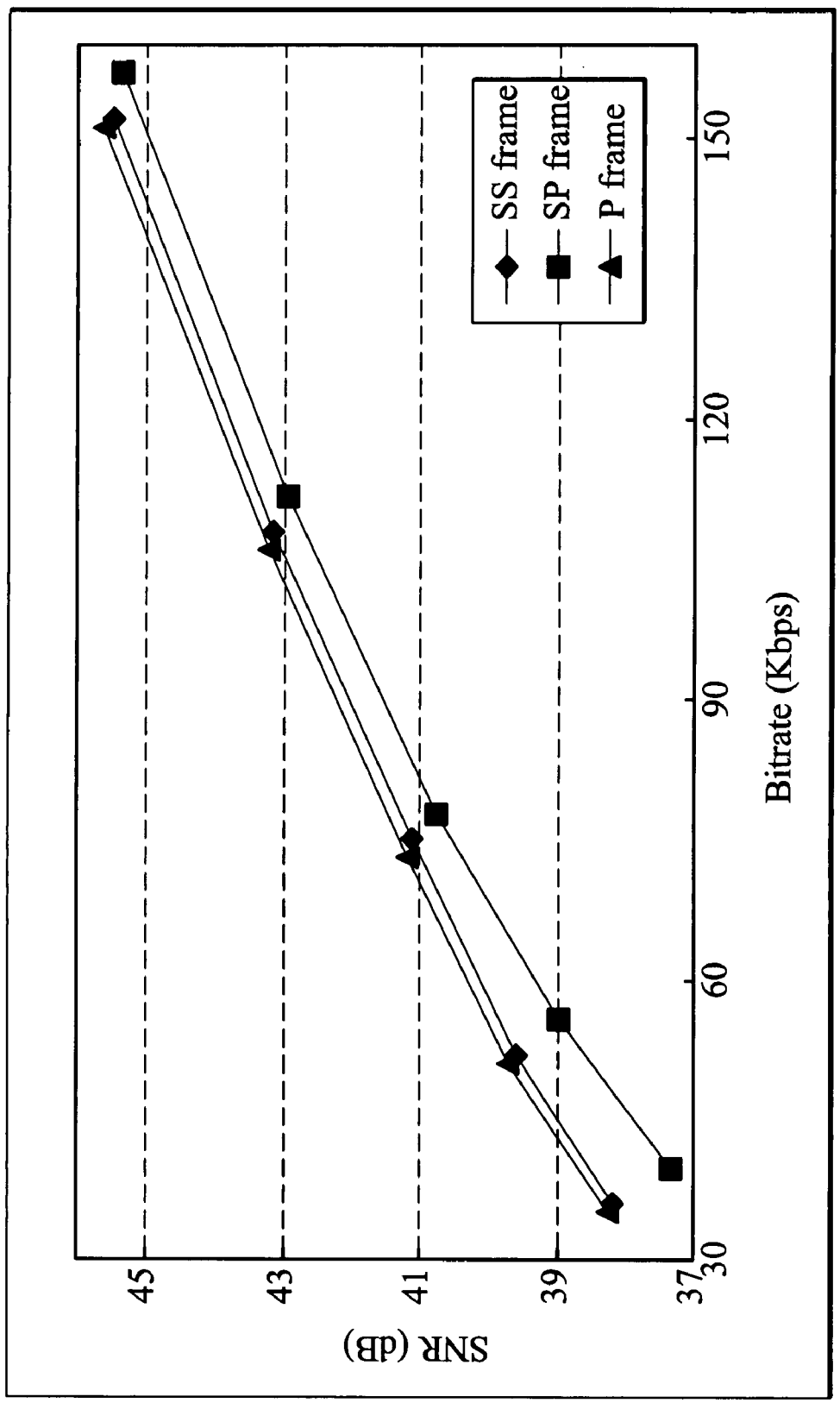
FIG. 6 shows encoding efficiency of high bitrate bitstreams respectively using SS frames, SP frames, and P frames.

FIG. 6 shows encoding efficiency of high bitrate bitstreams respectively using SS frames, SP frames, and P frames. As shown, encoding efficiency of high bitrate bitstreams is decreased by the two requantization units in encoder 300 when using SP. Thus, the encoder 500 according to an embodiment of the invention removes one requantization unit in encoder 300, and rearranges the method to generate bridge frame. As shown, encoding efficiency of high bitrate bitstreams using the SS frame disclosed by an embodiment of the invention is closed to that using P frame, and achieves seamless bitstream switching. In addition, irrespective of whether the bitrate of bitstream is switched from high to low or low to high, the identical bridge frame $SS_{HL}(=SS_{LH})$ is used, without generating different types of frames, such as frames $SP_{LH}$ and $SP_{HL}$ in FIGS. 2A and 2B.

While the invention has been described by way of example and in terms of preferred embodiment, it is to be understood that the invention is not limited thereto. Those skilled in the technology can still make various alterations and modifications without departing from the scope and spirit of this invention. Therefore, the scope of the present invention shall be defined and protected by the following claims and their equivalents.

What is claimed is:

1. An encoder, comprising:
    a memory;
    a first encoding unit coupled to a third encoding unit, discrete cosine transforming an input frame, quantizing the transformation result, and generating a first frame according to a motion vector, wherein the first encoding unit comprises a first feedback unit dequantizing the transformation result, generating a processing signal and a first reconstruction signal according to the dequantization result, and requantizing the processing signal to generate a requantization signal; and
    a second encoding unit coupled to the third encoding unit, encoding according to the first reconstruction signal to generate a second frame and an encoding signal, wherein the third encoding unit generates a third frame according to the encoding signal and the requantization signal,
    wherein the third encoding unit comprises:
        a third-encoding-unit adder subtracting the requantization signal from the encoding signal; and
        a third-encoding-unit statistic encoding unit statistically encoding the output of the third-encoding-unit adder to generate the third frame, and
    wherein the second encoding unit comprises:
        a second-encoding-unit transformation unit receiving the first reconstruction signal and discrete cosine transforming the first reconstruction signal to generate a second-encoding-unit first signal;
        a second-encoding-unit first adder subtracting a second-encoding-unit second signal from the second-encoding-unit first signal;
        a second-encoding-unit quantization unit quantizing the output of the second-encoding-unit adder to generate a second-encoding-unit third signal; and
        a second-encoding-unit statistic encoding unit statistically encoding the second-encoding-unit third signal and the motion vector to generate the second frame; and
    a second-encoding-unit feedback unit comprising:
        a second-encoding-unit dequantization unit receiving the second-encoding-unit third signal and dequantizing the second-encoding-unit third signal;
        a second-encoding-unit second adder adding the output of the second-encoding-unit dequantization unit and the second-encoding-unit second signal;
        a second-encoding-unit signal processing unit processing the output of the second-encoding-unit second adder to generate a second fifth signal; and
        a second-encoding-unit requantization unit requantizing the second fifth signal to generate the second-encoding-unit second signal and the encoding signal.

2. The encoder as claimed in claim 1, wherein the first encoding unit further comprises:
    a first-encoding-unit transformation unit receiving the input frame and discrete cosine transforming the input frame to generate a first-encoding-unit first signal;
    a first-encoding-unit adder subtracting a first-encoding-unit second signal from the first-encoding-unit first signal;
    a first-encoding-unit quantization unit quantizing the output of the first-encoding-unit adder to generate a first-encoding-unit third signal; and
    a first-encoding-unit statistic encoding unit statistically encoding the first-encoding-unit third signal and the motion vector to generate the first frame.

3. The encoder as claimed in claim 2, wherein the first feedback unit comprises:
    a first-feedback-unit dequantization unit receiving the first-encoding-unit third signal and dequantizing the first-encoding-unit third signal;
    a first-feedback-unit adder adding the output of the first-encoding-unit dequantization unit and the first-encoding-unit second signal;
    a first-feedback-unit signal processing unit processing the output of the first-feedback-unit adder to generate the processing signal and the first reconstruction signal; and
    a first-feedback-unit requantization unit requantizing the processing signal to generate the first-encoding-unit second signal and the requantization signal.

4. The encoder as claimed in claim 3, wherein the first signal processing unit comprises:
    a first-signal-processing-unit inverse transformation unit performing inverse discrete cosine transformation on the output of the first-encoding-unit adder;
    a first-signal-processing-unit filter filtering the output of the first-signal-processing-unit inverse transformation unit to generate the first reconstruction signal;
    a first-signal-processing-unit memory unit storing the first reconstruction signal;
    a first-signal-processing-unit compensation unit coupled to the first-signal-processing-unit memory unit, compensating the first reconstruction signal according to the motion vector; and
    a first-signal-processing-unit transformation unit discrete cosine transforming the output of the first-signal-processing-unit compensation unit to generate the processing signal.

5. The encoder as claimed in claim 4, wherein the first requantization unit comprises:
    a first-requantization-unit quantization unit quantizing the processing signal to generate the requantization signal; and
    a first-requantization-unit dequantization unit dequantizing the requantization signal to generate the first-encoding-unit second signal.

6. The encoder as claimed in claim 4, wherein the first-encoding-unit transformation unit and the first-signal-processing-unit transformation unit are discrete cosine transformation units.

7. The encoder as claimed in claim 4, wherein the first-signal-processing-unit inverse transformation unit is an inverse discrete cosine transformation unit.

8. The encoder as claimed in claim 6, wherein the second signal processing unit comprises:
    a second-signal-processing-unit inverse transformation unit performing inverse discrete cosine transformation on the output of second-encoding-unit second adder;

a second-signal-processing-unit filter filtering the output of the second-signal-processing-unit inverse transformation unit to generate a second reconstruction signal;

a second-signal-processing-unit memory unit storing the second reconstruction signal;

a second-signal-processing-unit compensation unit coupled to the second-signal-processing-unit memory unit, compensating the second reconstruction signal according to the motion vector; and a second-signal-processing-unit transformation unit discrete cosine transforming the output of the second-signal-processing-unit compensation unit to generate the second fifth signal.

9. The encoder as claimed in claim 8, wherein the second requantization unit comprises:

a second-requantization-unit quantization unit quantizing the second fifth signal to generate the encoding signal; and a second-requantization-unit dequantization unit dequantizing the encoding signal to generate the second-encoding-unit second signal.

10. The encoder as claimed in claim 8, wherein the second-encoding-unit transformation unit and the second-signal-processing-unit transformation unit are discrete cosine transformation units.

11. The encoder as claimed in claim 8, wherein the second-signal-processing-unit inverse transformation unit is an inverse discrete cosine transformation unit.

12. The encoder as claimed in claim 9, wherein the first-encoding-unit quantization unit, the first-feedback-unit dequantization unit, the second-encoding-unit quantization unit, and the second-encoding-unit dequantization unit have a first quantization parameter.

13. The encoder as claimed in claim 12, wherein the first-requantization-unit quantization unit, the first-requantization-unit dequantization unit, the second-requantization-unit quantization unit, and the second-requantization-unit dequantization unit have a second quantization parameter.

14. The encoder as claimed in claim 13, wherein the first quantization parameter exceeds the second quantization parameter.

15. The encoder as claimed in claim 1, wherein each of the first-encoding-unit statistic encoding unit, the second-encoding-unit statistic encoding unit and the third-encoding-unit statistic encoding unit is one of an entropy coding unit and a variable length coding unit.

16. The encoder as claimed in claim 8, wherein the first-signal-processing-unit filter and the second-signal-processing-unit filter are loop filters.

17. The encoder as claimed in claim 8, wherein the first-signal-processing-unit compensation unit and the second-signal-processing-unit compensation unit are motion compensation units.

18. The encoder as claimed in claim 1, wherein the first encoding unit is a high bitrate encoding unit.

19. The encoder as claimed in claim 18, wherein the second encoding unit is a low bitrate encoding unit.

20. The encoder as claimed in claim 19, wherein seamless bitstream switching is achieved by transmitting the second frame and the third frame to a client when a bandwidth of the client is switched from a high bitrate to a low bitrate.

21. The encoder as claimed in claim 19, wherein seamless bitstream switching is achieved by transmitting the third frame and the first frame to a client when a bandwidth of the client is switched from a low bitrate to a high bitrate.

22. An image encoding method, comprising:

discrete cosine transforming an input frame, quantizing the transformation result, and generating a first frame according to a motion vector;

dequantizing the transformation result, and generating a processing signal and a first reconstruction signal according to the dequantization result;

requantizing the processing signal to generate a requantization signal;

encoding, by a encoding device, according to the first reconstruction signal to generate a second frame and an encoding signal;

generating a third frame according to the encoding signal and the requantization signal;

statistically encoding a difference between the encoding signal and the requantization signal to generate the third frame;

discrete cosine transforming the first reconstruction signal to generate a first signal;

quantizing a difference between the first signal and a second signal to generate a third signal; and statistically encoding the third signal and the motion vector to generate the second frame.

23. The image encoding method as claimed in claim 22, further comprising:

receiving the input frame and discrete cosine transforming the input frame to generate a fifth signal;

quantizing a difference between the fifth signal and a sixth signal to generate a seventh signal; and statistically encoding the seventh signal and the motion vector to generate the first frame.

24. The image encoding method as claimed in claim 23, further comprising:

dequantizing the seventh signal;

processing a sum of the dequantized seventh signal and the sixth signal to generate the processing signal and the first reconstruction signal; and requantizing the processing signal to generate the sixth signal and the requantization signal.

25. The image encoding method as claimed in claim 22, further comprising:

dequantizing the third signal;

processing a sum of the dequantized third signal and the second signal to generate a fourth signal; and requantizing the fourth signal to generate the second signal and the encoding signal.

26. The image encoding method as claimed in claim 24, further comprising:

inverse discrete cosine transforming a sum of the re-quantized seventh signal and the sixth signal to generate the first reconstruction signal;

compensating the first reconstruction signal according to the motion vector; and discrete cosine transforming the compensated first reconstruction signal to generate the processing signal.

27. The image encoding method as claimed in claim 26, further comprising:

quantizing the processing signal to generate the requantization signal; and dequantizing the requantization signal to generate the sixth signal.

28. The image encoding method as claimed in claim 27, further comprising:

inverse discrete cosine transforming a sum of the dequantized third signal and the second signal to generate a second reconstruction signal;

compensating the second reconstruction signal according to the motion vector; and discrete cosine transforming the compensated second reconstruction signal to generate the fourth signal.

29. The image encoding method as claimed in claim 28, further comprising:

quantizing the fourth signal to generate the encoding signal; and dequantizing the encoding signal to generate the second signal.

* * * * *